(12) United States Patent
John et al.

(10) Patent No.: US 11,263,597 B2
(45) Date of Patent: Mar. 1, 2022

(54) WORKSCOPE SYSTEM AND METHOD OF USE THEREOF

(71) Applicant: GENERAL ELECTRIC COMPANY, Schenectady, NY (US)

(72) Inventors: Vijay Thomas John, Mason, OH (US); Mikhail Krivenko, Danville, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 555 days.

(21) Appl. No.: 16/005,667

(22) Filed: Jun. 11, 2018

(65) Prior Publication Data

US 2018/0357615 A1 Dec. 13, 2018

Related U.S. Application Data

(60) Provisional application No. 62/518,332, filed on Jun. 12, 2017.

(51) Int. Cl.
*G06Q 10/00* (2012.01)
*G06N 20/00* (2019.01)
*G06N 5/00* (2006.01)

(52) U.S. Cl.
CPC ............ *G06Q 10/20* (2013.01); *G06N 20/00* (2019.01); *G06N 5/003* (2013.01)

(58) Field of Classification Search
None
See application file for complete search history.

(56) References Cited

U.S. PATENT DOCUMENTS

| 8,291,043 | B2 | 10/2012 | Hadley et al. | |
|---|---|---|---|---|
| 9,046,892 | B2 | 6/2015 | Jang et al. | |
| 2006/0010152 | A1 | 1/2006 | Catalano et al. | |
| 2008/0249828 | A1* | 10/2008 | MacAuley | G06Q 10/06311 |
| | | | | 705/7.13 |
| 2009/0281993 | A1* | 11/2009 | Hadley | G06Q 10/06 |
| 2010/0030807 | A1* | 2/2010 | Topping | G05B 23/0283 |
| | | | | 705/1.1 |
| 2013/0288210 | A1 | 10/2013 | Stewart et al. | |
| 2017/0018026 | A1* | 1/2017 | Rigdon | G06Q 40/00 |
| 2018/0068499 | A1* | 3/2018 | Abraham | G06Q 10/20 |

OTHER PUBLICATIONS

Considering Aircraft Service Information; Jan. 2013, Steven Bentley, www.sassofia.com (Year: 2013).*
International Preliminary Report on Patentability Received for PCT Application No. PCT/US201 8/036993, dated Dec. 26, 2019, 11 pages.
International Search Report and Written Opinion issued in connection with corresponding PCT Application No. PCT/US2018/036993 dated Oct. 22, 2018, 12 pages.

* cited by examiner

*Primary Examiner* — Dennis W Ruhl
(74) *Attorney, Agent, or Firm* — Wood IP LLC

(57) ABSTRACT

There is provided a system for workscoping an asset. The system includes a processor and a memory that includes instructions that, when executed by the processor, cause the processor to perform operations including fetching information indicative of a service bulletin and associating the information with a module of the asset.

20 Claims, 4 Drawing Sheets

WORKSCOPE SYSTEM AND METHOD OF USE THEREOF

CROSS-REFERENCE TO RELATED APPLICATIONS

The present disclosure claims the benefit of U.S. Provisional Patent Application No. 62/518,332, filed on Jun. 12, 2017, the content of which is incorporated herein by reference in its entirety.

BACKGROUND

The management of large scale fleets of industrial assets typically requires scheduling and conducting maintenance tasks to service faulty equipment, prevent future equipment failure, and/or to comply with regulatory requirements. Typically, when an asset reaches a shop for maintenance, a typical management system is used to plan, carry out, and track a various set of tasks. These typical management systems require significant human input and decision making given the complexity of the tasks that need to be carried out and the technological complexity of the asset to be serviced. Furthermore, there is no current standardized methodology for storing and recalling workscope information for usage and tracking. As such, repair shops store workscope information in different formats, and without standardization. This can lead shops to spend a lot of time looking for workscope related information in different locations, which can further reduce productivity. In addition, workscope escalations may occur at a higher than desired rate, and the number of workscope escalations can have a significant financial impact.

SUMMARY

One embodiment provides a system for workscoping an asset. The system includes a processor and a memory that includes instructions that, when executed by the processor, cause the processor to perform operations including fetching information indicative of a service bulletin and associating the information with a module of the asset.

Another embodiment provides a system for workscoping an asset. The system includes a processor and a memory that includes instructions that, when executed by the processor, cause the processor to perform certain operations. The operations include performing a mapping of a service bulletin to a module of the asset.

Yet another embodiment provides a system for workscoping an asset. The system includes a processor and a memory that includes instructions that, when executed by the processor, cause the processor to perform certain operations. The operations can include determining service bulletins applicable to a module of the asset based on an identity of the asset or the module, mapping a service bulletin to the module, and associating a disassembly level to the service bulletin. The operations may further include adding a set of modules to the service bulletin.

DETAILED DESCRIPTION

Figure 1:
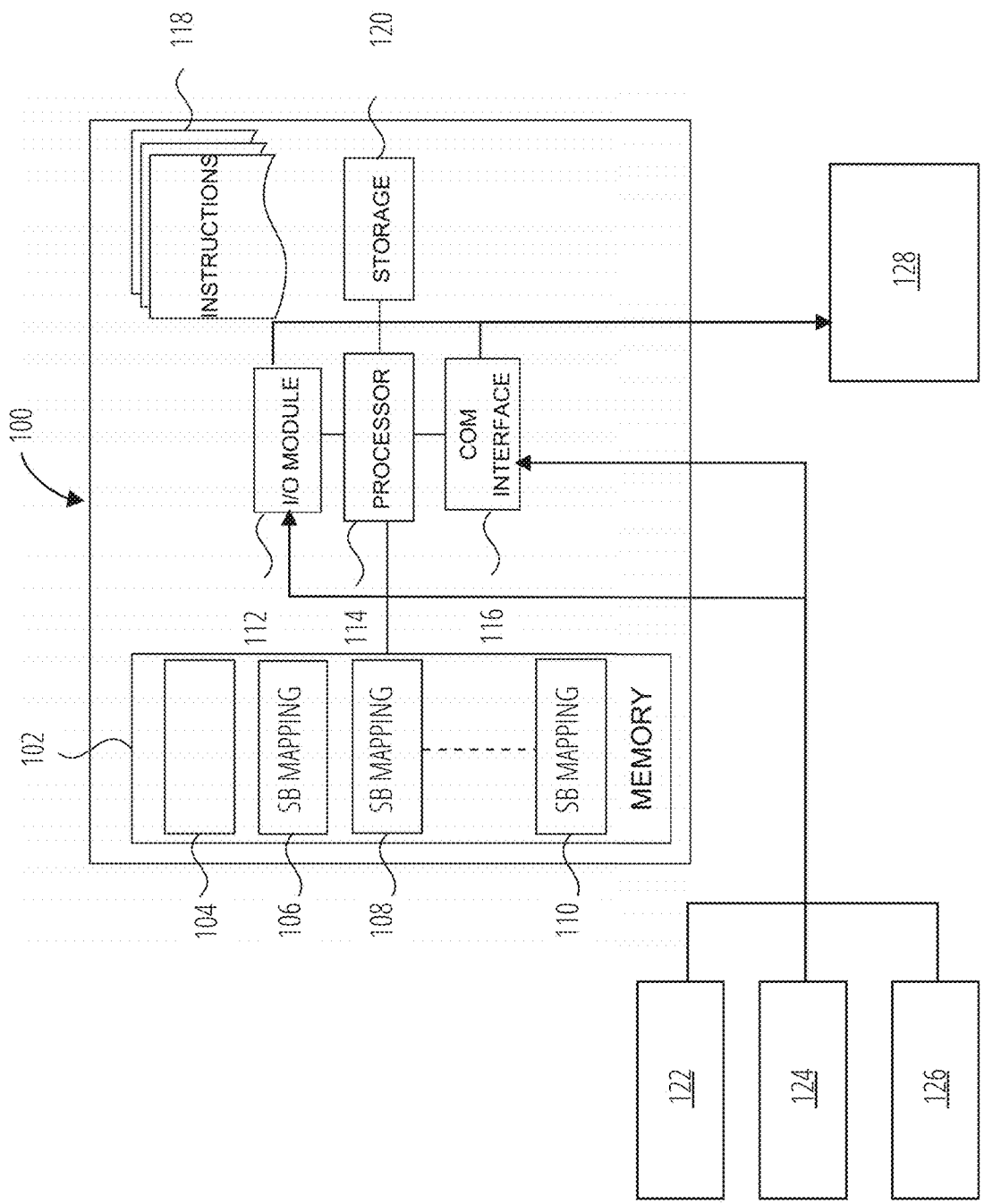
FIG. 1 illustrates a controller in accordance with one embodiment.

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

As noted above, repair shops typically store workscope information in different formats, and without standardization. This can lead shop personnel to spend a lot of time looking for workscope related information in different locations, which can reduce productivity. In addition, workscope escalations may occur at a higher than desired rate, and the number of workscope escalations can lead to a significant increase in costs.

As such, the exemplary embodiments provide tangible data associated with the cause of workscope escalations, and they enable a process to determine when escalations will occur, associate costs with escalations, and prevent escalations, thus enabling an optimal workscope to be performed, which in time maximizes in-field time-of-use of the asset. For example, when the asset is an airplane engine, the in-field time-of-use corresponds to the time on the engine spends on the wing without being serviced.

An exemplary workscope tool according to an embodiment enables the intelligent mapping of Service Bulletins (SBs) to specific modules (i.e., ATAs). Specifically, within an asset there are modules that define the entire asset, and the modules perform different functions and/or have different purposes. For example, for an engine, the modules can be, but are not limited to, a fan, a compressor, a combustor, and an HPT. Thus, in the exemplary workscope tool, an SB can be mapped to the modules via a pre-existing or predetermined set of criteria, or via a mapping table. Additionally, or alternatively, the SBs can be mapped to the modules dynamically. For example, the SBs can be mapped to the modules using optical character recognition, machine learning and/or artificial intelligence.

Furthermore, the exemplary embodiments featured herein provide for mapping SBs to the respective workscope levels based on the level of teardown to be performed to do maintenance indicated or required in the SB on the modules of the asset. For example, a given module may have four escalating teardown levels, where the first teardown level (e.g., 1) requires a shop or technician to maintain the module with no disassembly, and not perform any repairs, and the fourth teardown level requires the shop or technician to completely disassemble the module down to a piece part level. In this scenario, an exemplary workscope tool can map a SB to a module to one of the four teardown levels based on the requirements of the SB. The mapping can be done based on a preexisting or predetermined set of criteria, or via a mapping table. Additionally, or alternatively, the mapping may be accomplished dynamically. For example, the mapping can be accomplished via machine learning and/or artificial intelligence.

Moreover, the embodiments featured herein can provide for the addition of multiple modules to a SB. For example, a part included in a SB for a first module may impact multiple other modules. The exemplary workscope tool thus enables the addition of the multiple other modules to the SB. The additional modules can be added to the SB dynamically. For example, the workscope tool can analyze the SB and components or parts included in the bulletin, and based on the analysis, identify additional modules impacted by the components or parts; furthermore, the workscope tool can add the additional modules to the workscope or SB.

The embodiments featured herein further provide the ability to drive workscope disassembly levels automatically based on a SB. If there are multiple SBs for a module, the exemplary workscope tool can analyze the multiple SBs and determine or drive the teardown level for that module. For example, if there are three SBs for a module, wherein the first SB requires a teardown level of 1, the second SB requires a teardown level of 2, and the third SB requires a teardown level of 4, the workscope tool can determine that the appropriate or required teardown level to complete or satisfy all of the SBs is 4. Also, where a current teardown level has been determined for a module, the workscope tool can identify conflicts and determine a new teardown level where a shop or technician determines the need to, or wants to, do additional service beyond the service bulletin. For example, if a module currently has a teardown level of 2, and a technician wants to do additional service on the module, then the workscope tool can determine that the additional service will escalate the teardown level for the module and identify the cost associated with the escalation of the teardown level.

Furthermore, an exemplary workscope tool can provide the capability to determine SBs applicable to a particular asset of module based on an identity of the asset or module. For example, the exemplary workscope tool can determine SBs applicable to a particular engine based on a serial number of the engine. For instance, the exemplary workscope tool can identify an engine based on the serial number, determine and subtract SBs that have previously been completed for the engine, and determine and add SBs that are outstanding.

FIG. 1 shows a block diagram of a controller 100, which can include a processor 114 that has a specific structure. The controller 100 may be part of the exemplary workscope tool described above, conferring it the specific features discussed. The specific structure of the processor 114 can be imparted to it by instructions stored in a memory 102 included in (or accessible to) the controller 100 and/or by instructions 118 that can be fetched by the processor 114 from a storage medium 120. The storage medium 120 may be co-located with the controller 100 as shown, or it may be located elsewhere and be communicatively coupled to controller 100.

The controller 100 can be a stand-alone programmable system, or it can be a programmable module located in a much larger system. The controller may include one or more hardware and/or software components configured to fetch, decode, execute, store, analyze, distribute, evaluate, and/or categorize information. Furthermore, the controller 100 can include an input/output (I/O) module 112 that can be configured to interface with a plurality of databases (e.g., database 122, 124, and 126). These databases may include information relating to SBs that are to be applied to specific modules of an asset under test, such application depending on the instructions 118 or instructions fetched from the memory 102.

The processor 114 may include one or more processing devices or cores (not shown). In some embodiments, the processor 114 may be a plurality of processors, each having either one or more cores. The processor 114 can be configured to execute instructions fetched from the memory 102, i.e. from one of memory blocks 104, 106, 108, or memory block 110, or the instructions may be fetched from the storage medium 120, or from a remote device connected to the controller 100 via a communication interface 116.

Without loss of generality, the storage medium 120 and/or memory 102 may include a volatile or non-volatile, magnetic, semiconductor, tape, optical, removable, non-removable, read-only, random-access, or any type of non-transitory computer-readable computer medium. The storage medium 120 and/or the memory 102 may include programs and/or other information that may be used by the processor 114. Furthermore, the storage medium 120 may be configured to log data processed, recorded, or collected during the operation of controller 100. The data may be time-stamped, location-stamped, cataloged, indexed, or organized in a variety of ways consistent with data storage practice.

In one embodiment, for example, the memory blocks 106, 108, or 110 may include instructions that, when executed by the processor 114, cause the processor 114 to perform certain operations. The operations can include determining which service bulletins fetched from one of databases 122, 124, and 126 are applicable to a module of an asset based on an identity of the asset or the module. The identity of the asset or the module may be received via the I/O module 112. The operations can further include mapping a specific service bulletin to the asset or the module, and they may further include associating a disassembly level to the service bulletin. The operations may also include adding a set of modules to the service bulletin, thus updating the service bulletins and saving them back to one of the databases 122, 124, and 126. Upon completion of the aforementioned operations, the controller 100 may output a workscope template 128.

Figure 2:
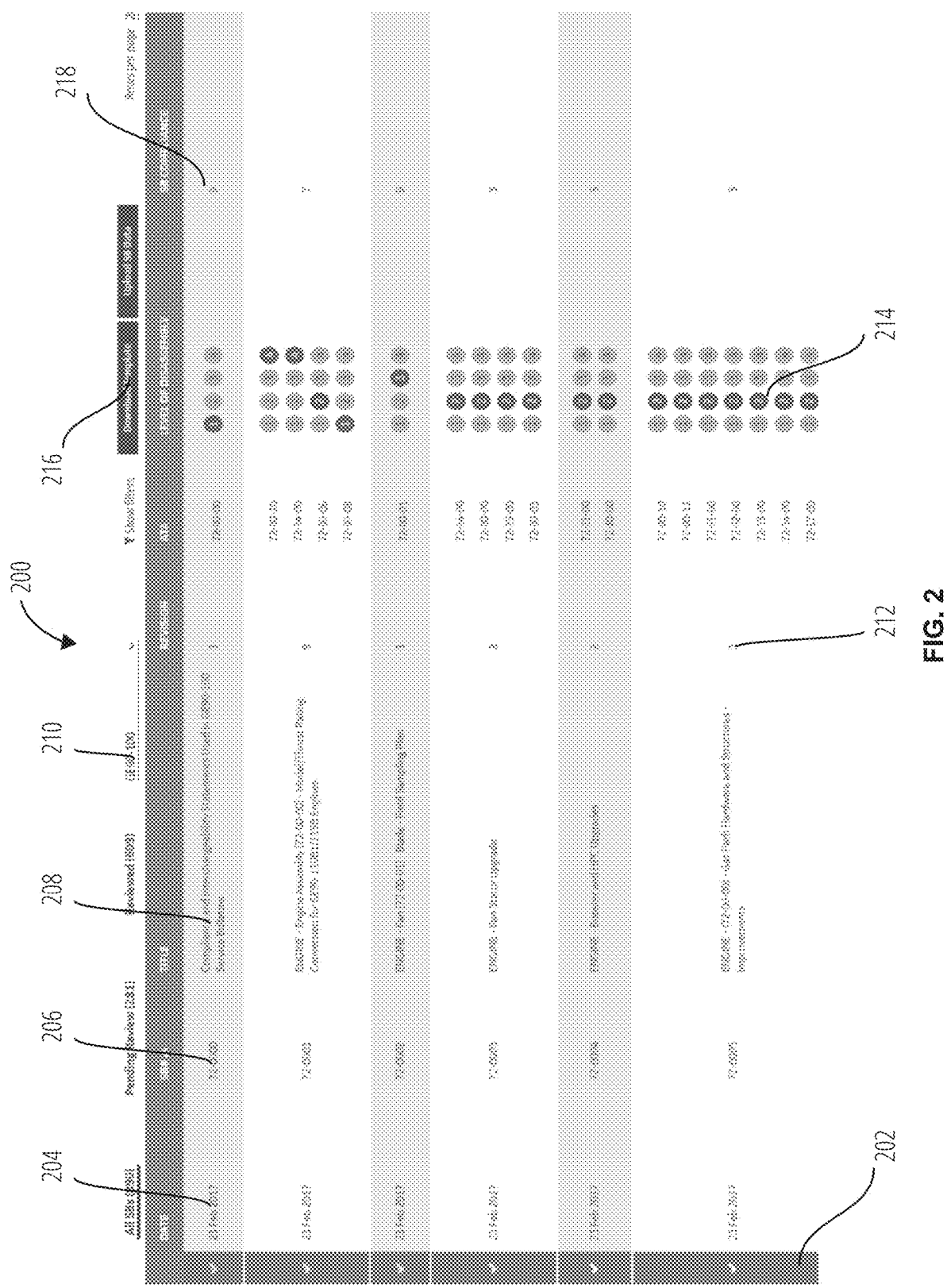
FIG. 2 illustrates a screenshot in accordance with one embodiment.

FIG. 2 shows an example screenshot 200 of the updated workscope template 128. The workscope template 128 may include a field 202 indicating all the SBs that have been fetched by the processor 114. The field 204 may indicate a date at which the workscoping is being conducted. The field 206 indicates the module associated with each SBs that have been fetched, whereas the field 208 may include descriptive information relating to each SB. The field 210 may indicate a particular manufacturer or an identifier of the asset. The workscope template 128 may further include a field 212 indicating the number of revisions associated with each SB. The workscope template 128 also includes fields 214, 216, and 218 which indicate, respectively, the determined level of disassembly for each module according to its applicable SB, interactable features for exporting the workscope template 128, and compliance information associated with the SB. It is noted that the screenshot 200 represents an exemplary configuration and that the workscope template 128 may be structured differently than shown, without departing from the scope of the present disclosure.

Figure 3:
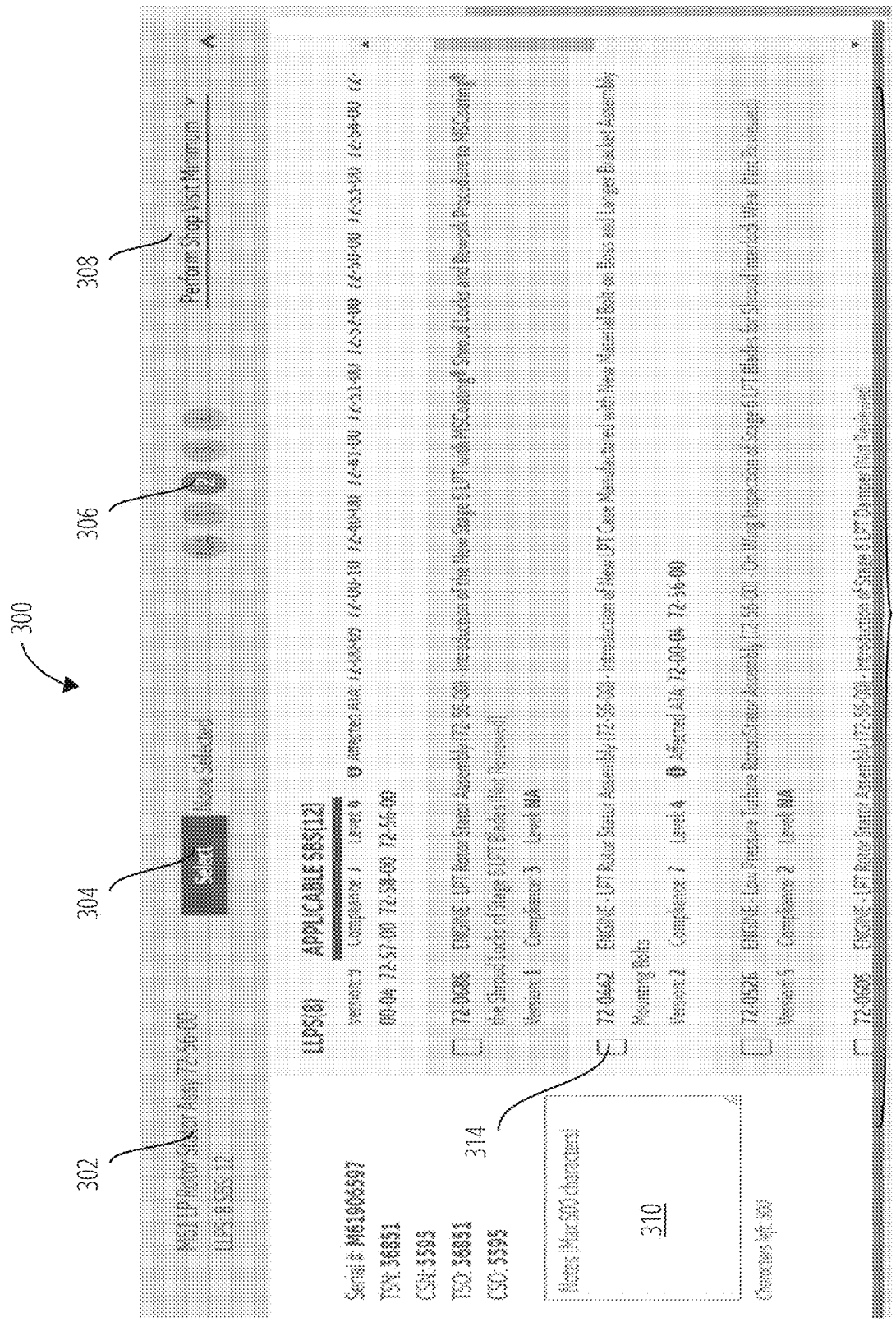
FIG. 3 illustrates a screenshot in accordance with one embodiment.

FIG. 3 illustrates additional features of the workscope template 128 through a screenshot 300. For example, the workscope template 128 may include a field 302 that indicates a particular module and a field 304 for selecting a particular SB that has been map. The screenshot 300 further includes a disassembly level indicated by the field 306 and additional workscope information shown in the field 308. A field 310 may be used to enter notes for future reference.

All possible SBs that have been mapped to the module identified in the field 302 may be tabulated in the field 312. When a user selects a particular SB, say at the field 314, the exemplary workscope tool may prompt the user that the selected SB will increase the module's disassembly level listed in the field 306, at which point a user may discontinue and select another SB or may override the notification and proceed with the increased level of disassembly.

Figure 4:
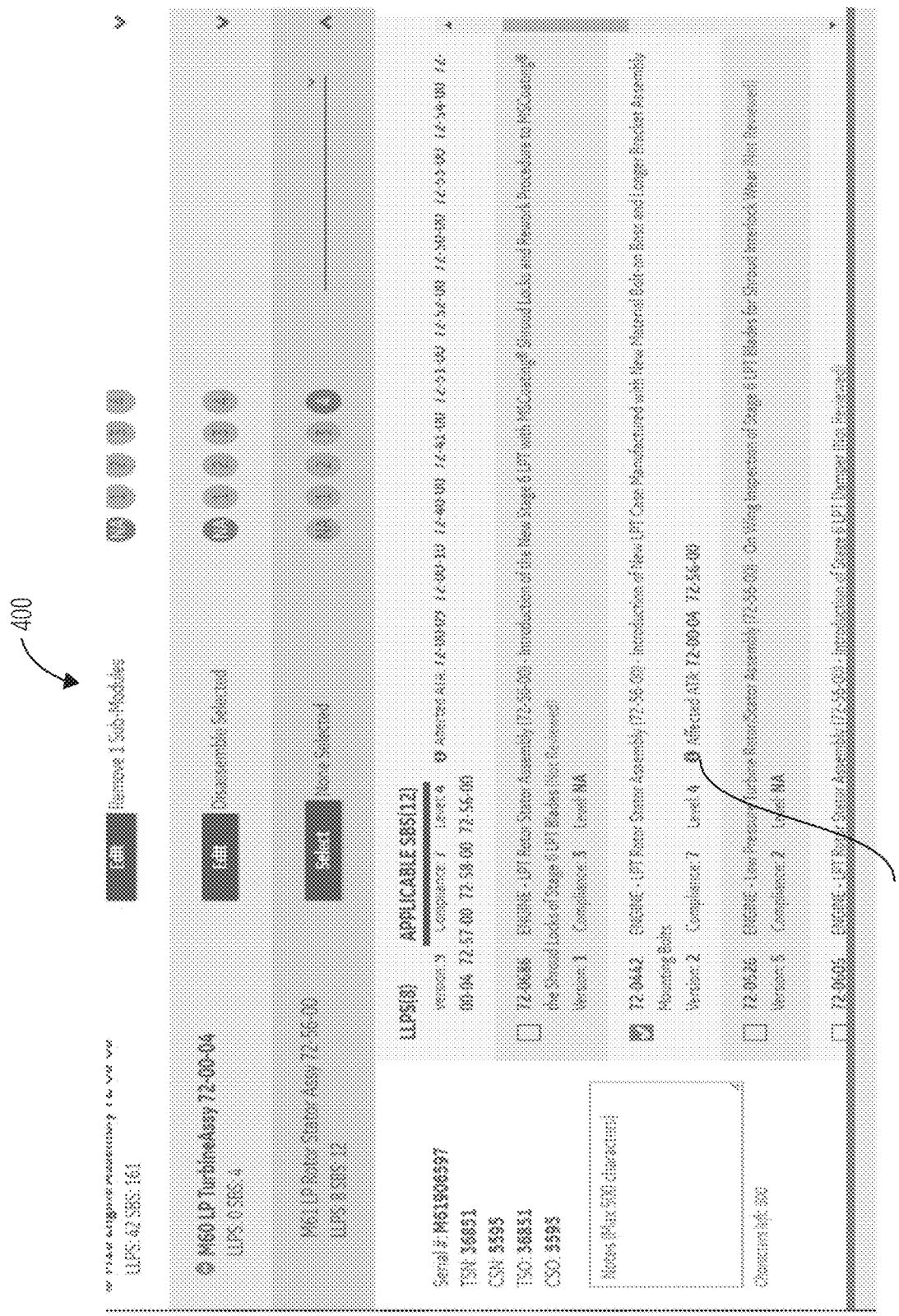
FIG. 4 illustrates a screenshot in accordance with one embodiment.

As shown in FIG. 4 through the screenshot 400, the workscope template 128 may be updated to indicate that the selected SB is associated with specific module. The SB mapping feature of the exemplary workscope tool brings SB applicability per asset, e.g., per engine. It provides SB to the workscope level logic and its impact on workscope disassembly levels. Furthermore, the exemplary workscope tool gives visibility into workscope disassembly level and cost (field 402). Moreover, the exemplary workscope tool gives visibility into how it affects multiple modules and levels of disassembly. As such, the exemplary workscope tool has many advantages over typical workscope tools. For instance, typical tools seek to look up all SBs from customer records and shop records in a non-standardized fashion. Thus, with typical tools, there is no way to understand how SB's drive workscope levels. Furthermore, typical tools offer no way to understand how SB's drives cost impact and no way to understand the impact of one SB over multiple modules and levels of disassembly it drives.

Those skilled in the relevant art(s) will appreciate that various adaptations and modifications of the embodiments described above can be configured without departing from the scope and spirit of the disclosure. Therefore, it is to be understood that, within the scope of the appended claims, the teachings featured herein may be practiced other than as specifically described herein.

What is claimed is:

1. A system for workscoping an asset, the system comprising:
   a controller comprising an input/output module and a processor;
   a memory including instructions that, when executed by the processor, cause the processor to perform operations comprising:
   fetching information indicative of a service bulletin;
   dynamically performing intelligent mapping of the service bulletin to one or more modules of an asset;
   dynamically determining a disassembly level of each of the one or more modules based on (i) requirements of the service bulletin, and (ii) one or more additional factors affecting a determined workscope level; and
   changing a predetermined disassembly level of the service bulletin based on the dynamically determined level of disassembly;
   wherein the controller is configured to output a workscope template via the input/output module, the workscope template displaying, in a first portion of the workscope template, (i) identification information associated with each of the one or more modules and (ii) a graphical representation of the disassembly level as determined for each of the one or more modules;
   wherein, the workscope template displays in a second portion of the workscope template, (i) the service bulletin as fetched and (ii) at least one selectable service bulletin, the service bulletin as fetched being indicated with its corresponding one or more modules; and
   wherein, when a user selects a selectable service bulletin from the second portion of the workscope template, the system is configured to notify the user of whether the service bulletin will increase the disassembly level of the one or more modules by updating the graphical representation of the disassembly level that is displayed in the first portion of the workscope template.

2. The system of claim 1, wherein the operations further include determining a set of service bulletins applicable to the module based on an identity of the module.

3. The system of claim 1, wherein the operations further include determining and subtracting service bulletins that have previously been completed and determining and adding service bulletins that are outstanding.

4. The system of claim 1, wherein the one or more additional factors include conflicts between the service bulletin and one or more additional service bulletins.

5. The system of claim 4, wherein the operations further include identifying the conflicts and determining a new teardown level for the module.

6. A system for workscoping an asset, the system comprising:
   a processor;
   a memory including instructions that, when executed by the processor, cause the processor to perform operations comprising:
   determining service bulletins applicable to a first module of the asset based on an identity of the asset or the module;
   mapping a service bulletin to the first module;
   associating a disassembly level to the service bulletin based on (i) requirements of the service bulletin, and (ii) one or more additional factors affecting a determined workscope level;
   changing a predetermined disassembly level of the service bulletin based on a dynamically determined level of disassembly; and
   dynamically adding one or more additional modules to the service bulletin based on an impact of the service bulletin to the first module;
   wherein a controller containing the memory is configured to output a workscope template via the input/output module, the workscope template displaying, in a first portion of the workscope template (i) identification information associated with the first module and (ii) a graphical representation of the disassembly level as determined for the first module;
   wherein, the workscope template displays in a second portion of the workscope template, (i) the service bulletin as fetched and (ii) at least one selectable service bulletin, the service bulletin as fetched being indicated with the first module; and
   wherein, when a user selects a selectable service bulletin from the second portion of the workscope template, the system is configured to notify the user of whether the service bulletin will increase the disassembly level of the first module and the one or more additional modules by updating the graphical representation of the disassembly level that is displayed in the first portion of the workscope template.

7. The system of claim 6, wherein the operations further include determining workscope disassembly levels automatically based on the service bulletin and analyze the service bulletins as determined applicable to the module and automatically modify the workscope disassembly level to complete all the service bulletins for the module.

8. The system of claim 6, wherein the one or more additional factors include conflicts between the service bulletin and one or more additional service bulletins.

9. A system for workscoping an asset, the system comprising:

a controller comprising an input/output module and a processor;

a memory including instructions that, when executed by the processor, cause the processor to perform operations comprising:

dynamically performing an intelligent mapping of a service bulletin to one or more modules of the asset; and dynamically determining a disassembly level of each of the one or more modules based on (i) requirements of the service bulletin and (ii) one or more additional factors affecting a determined workscope level;

changing a predetermined disassembly level of the one or more service bulletins based on the determined level of disassembly;

wherein the controller is configured to output a workscope template via the input/output module, the workscope template displaying, in a first portion of the workscope template (i) identification information associated with each of the one or more modules and (ii) a graphical representation of the disassembly level as determined for each of the one or more modules;

wherein, the workscope template displays in a second portion of the workscope template, (i) the service bulletin as fetched and (ii) at least one selectable service bulletin, the service bulletin as fetched being indicated with the one or more modules;

wherein, when a user selects a selectable service bulletin from the second portion of the workscope template, the system is configured to notify the user of whether the service bulletin will increase the disassembly level of the one or more modules by updating the graphical representation of the disassembly level that is displayed in the first portion of the workscope template; and wherein the mapping is based on a predetermined or preexisting set of criteria.

10. The system of claim 9, wherein the mapping includes a map table.

11. The system of claim 9, wherein the mapping includes dynamically associating the service bulletin to the module.

12. The system of claim 9, wherein the operations further include using artificial intelligence of machine learning to perform the mapping.

13. The system of claim 9, wherein the operations further include associating disassembly levels to a set of service bulletins.

14. The system of claim 9, wherein the operations include fetching the predetermined or preexisting set of criteria from a database.

15. The system of claim 9, wherein the operations further include changing a predetermined disassembly level of the service bulletin based on a determined level of disassembly.

16. The system of claim 15, wherein the operations further include determining a set of service bulletins applicable to the module.

17. The system of claim 15, herein the operations further include determining a set of service bulletins applicable to the module based on an identity of the module.

18. The system of claim 15, wherein the mapping includes dynamically associating the service bulletin to the module based on artificial intelligence.

19. The system of claim 15, wherein the mapping includes dynamically associating the service bulletin to the module based on an identity of the module.

20. The system of claim 9, wherein the one or more additional factors include conflicts between the service bulletin and one or more additional service bulletins.

* * * * *